United States Patent
Inha et al.

(10) Patent No.: US 9,431,841 B2
(45) Date of Patent: Aug. 30, 2016

(54) DEVICE TO DEVICE CHARGING VIA USB TYPE-C INTERFACES

(71) Applicant: Nokia Corporation, Espoo (FI)

(72) Inventors: Kai Inha, Jarvenpaa (FI); Juha Reinhold Backman, Espoo (FI); Pekka Talmola, Turku (FI); Pekka E. Leinonen, Turku (FI); Miika Tupala, Turku (FI)

(73) Assignee: Nokia Technologies Oy, Espoo (FI)

( * ) Notice: Subject to any disclaimer, the term of this patent is extended or adjusted under 35 U.S.C. 154(b) by 263 days.

(21) Appl. No.: 14/223,854

(22) Filed: Mar. 24, 2014

(65) Prior Publication Data

US 2015/0270733 A1 Sep. 24, 2015

(51) Int. Cl.
*H02J 7/00* (2006.01)

(52) U.S. Cl.
CPC ...... *H02J 7/0054* (2013.01); *H02J 2007/0062* (2013.01)

(58) Field of Classification Search
CPC .................................................... H02J 7/0054
USPC ....................................................... 320/103
See application file for complete search history.

(56) References Cited

U.S. PATENT DOCUMENTS

| | | | |
|---|---|---|---|
| 6,774,604 B2 * | 8/2004 | Matsuda et al. ........ | G06F 1/263 320/110 |
| 7,508,162 B2 | 3/2009 | Lippojoki et al. | |
| 7,733,061 B2 * | 6/2010 | Zemke et al. ........ | H02J 7/0055 307/66 |
| 8,350,534 B2 * | 1/2013 | Niculae ................ | H02J 7/0013 320/162 |
| 8,368,346 B2 | 2/2013 | Batson et al. | |
| 8,461,805 B2 * | 6/2013 | Sa et al. .............. | H01M 2/1022 320/111 |
| 2013/0290765 A1 * | 10/2013 | Waters et al. .......... | G06F 1/266 713/340 |
| 2014/0117922 A1 * | 5/2014 | Pham et al. .......... | H02J 7/0027 320/103 |

* cited by examiner

*Primary Examiner* — Sun Lin
(74) *Attorney, Agent, or Firm* — Mintz Levin Cohn Ferris Glovsky and Popeo, P.C.

(57) ABSTRACT

Methods and apparatus, including computer program products, are provided for device charging. In some example embodiments, there may be provided a method, which may include receiving, at a device, a request message to enter into a battery power supply mode; determining, by the device, whether to supply to a bus one of a battery source or a power charger source; and coupling, by the device based on the determining, one of the battery source or the power charger source to the bus to supply power to another device. Related systems, apparatus, and articles of manufacture may also be provided.

20 Claims, 5 Drawing Sheets

DEVICE TO DEVICE CHARGING VIA USB TYPE-C INTERFACES

FIELD

The subject matter described herein relates to interfaces including connectors and associated devices.

BACKGROUND

Physical connectors, such as the connector used with the Universal Serial Bus (USB), can be used to couple devices. USB standards may define physical and electrical aspects of USB. Examples of those standards include Universal Serial Bus 3.1 Specification and Universal Serial Bus 3.0 Specification, as well as any additions, revisions, and updates thereto. Within USB, there are certain types of connectors, such as the USB Type-C connector. The USB Type-C connector may refer to a connector having a relatively smaller size and/or being configured so that the USB Type-C connector can be coupled without regard to plug orientation and/or cable direction.

SUMMARY

Methods and apparatus, including computer program products, are provided for device charging.

In some example embodiments, there may be provided a method, which may include receiving, at a device, a request message to enter into a battery power supply mode; determining, by the device, whether to supply to a bus one of a battery source or a power charger source; and coupling, by the device based on the determining, one of the battery source or the power charger source to the bus to supply power to another device.

In some variations, one or more of the features disclosed herein including the following features can optionally be included in any feasible combination. The device may be configured to couple the battery source, the power charger source, or a combination of both to the bus comprising a voltage bus. The device may determine whether to supply the battery source or the power charger source based on at least one of a capability of the device or a preference of the device. A message may be sent to the bus one of the battery source or the power charger source. The device may include an interface through which the request message is received. The interface may include a universal serial bus connector and/or a universal serial bus type-c connector.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
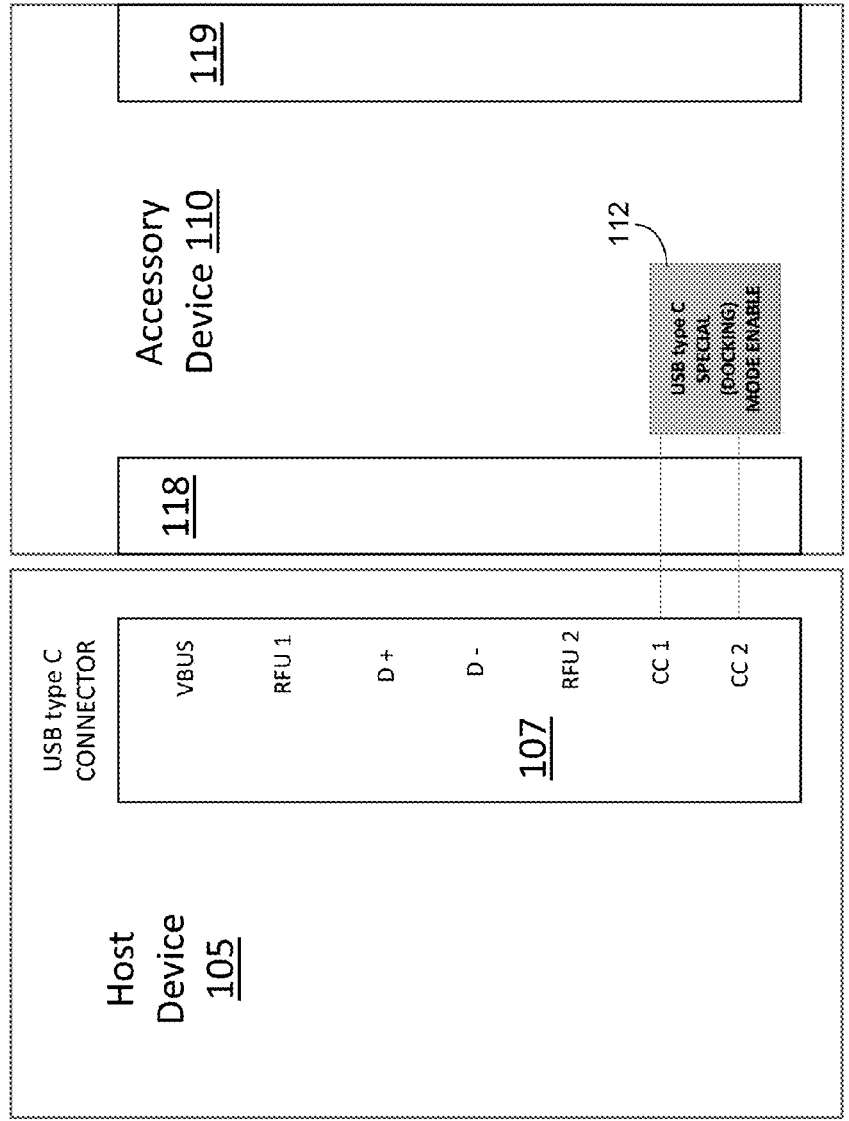
FIG. 1 depicts an example of a system including a host device and an accessory device, in accordance with some example embodiments.

Like labels are used to refer to same or similar items in the drawings.

DETAILED DESCRIPTION

Although some of the examples and drawings disclosed herein refer to certain types of universal serial bus (USB) accessories and interfaces including connectors, other types of accessories and interfaces may be used as well in accordance with the subject matter disclosed herein. Moreover, although some of the examples and refer to certain connector pin arrangements, other arrangements may be used as well.

In some example embodiments related to a USB Type-C interface, the USB Type-C interface may be used for a connection between devices to enable a power transfer (for example, to provide charging, a power source, and the like). In the case of device charging, a first device (which provides power) may initially have for example a substantially full (or almost full) battery reserve, while the second device to be charged may need a charge because this second device may have for example an empty or nearly empty battery power reserve. However, it may not be considered practical and/or energy efficient in this type of situation to use a standard USB charger source voltage (which provides for example 5 volts (V)). Instead, the first device may use its available battery voltage, and the first device may provide its battery voltage up to a point where the second device (which is being charged) is getting to the same voltage level as the first device. At this point, the charge current from the first device may be leveled off and, in some example embodiments, a negotiation may take place between the first and second devices to initiate a step up or boost to a charger power supply at the power sourcing side, such as the first device. Making this transition, or step up, from a battery voltage level (which may be less than about 5 volts at for example 3-5 volts) to a standard USB voltage level (for example, about 5 volts) may allow completion of the second device's charge process up to a fully charged battery level state.

FIG. 1 depicts an example system 100 including a USB Type-C connector 107 at a host device 105 and an accessory device 110 having a USB Type-C connector 118 coupling into connector 107. Although USB Type-C is depicted in this and other examples, other types of connectors may, as noted, be used as well.

The host device 105 may be implemented as any device which may provide a source of power, while the accessory device 110 may be any device that is being supplied power (for example, charged), although the roles of host and device may be reversed as well.

Host 105 may be implemented, in some example embodiments, as a dual-role host capable of directly connecting a battery to the VBUS to supply (or take) power and/or providing a USB charger source to the VBUS. The host 105 may, in some example embodiments, be implemented as a user equipment, such as a smartphone, an audio device, a video device, and/or any other device having a connector, such as a USB Type-C and the like.

The accessory device 110 may, in some example embodiments, be implemented as any type of device including for example a digital audio headset and/or any other accessory having one or more connectors, such as a USB Type-C and the like. Accessory 110 may be implemented, in some example embodiments, as a dual-role host capable of directly connecting a battery to the VBUS to supply (or take) power and/or providing a USB charger source to the VBUS. In battery source case, the direct connect battery voltage may vary from for example from 3 volts to 5 volts, although other voltage levels from the battery are possible, while the charger voltage level may be somewhat more consistent at for example 5 volts (although other values are possible as well). The direct connect battery voltage may generally be lower or equal to the charger voltage level.

The connectors 107, 118, and/or 119 may, in some example embodiments, be implemented as USB Type-C connectors. In the case of a USB Type-C connector, the connector may include one or more of the following connections: a power bus labeled (VBUS) for providing power, data pins (labeled RFU 1, RFU 2, D−, and/or D+), and/or configuration control (CC1 and CC2) pins, although other pin out arrangements and/or quantity of pins may be used as well.

In some example embodiments, the subject matter disclosed herein may provide an operational mode, in which device 110 is allowed to supply power to the VBUS at connector 118 and thus host 105 as for example, a typical charger power source at 5 volts and/or a battery connected power source within about 3 volts to about 5 volts. This operational mode may thus allow device 110 to serve as a dual-role device providing a direct battery connection to the VBUS and/or a charger power connection to the VBUS. The device 110 may thus supply power to VBUS while otherwise continuing to operate in the device role. For example, communication between host 105 and device 110 may be independent of the power provider. Host 105 may for example act as the master of the communication and the device may still act as the slave of the communication, even if the device provides power to VBUS.

Host 105, acting as a dual-role device, may act as a USB Host, and may request that an attached device 110 (currently acting as a USB Device) to enter into the operational mode. The USB host 105 may then monitor the USB device's 110 behavior (for example, the VBUS voltage and/or a response message), and the USB host 105 may then determine whether to stay in the battery 3-5 V mode or to change to a 5 V charger mode (with no direct battery connection).

Although some of the examples refer to a "direct battery connection," the direct battery connection may refer to applying at least one battery source to a VBUS (without for example a boost from another power source or using a boost converter), and this direct battery connection may include other components between the host and device (for example, current control components, current limiting resistors, DC-DC converters, and the like).

In some example embodiments, host 105 may send a request message to device 110 to enter into a direct battery connection mode in which device 110 directly connects a battery to the VBUS and thus host 105 (and this direct battery connect mode may not include any battery voltage boosting from another power source or a boost converter).

When device 110 receives the request, device 110 may determine whether it should supply for example a 5 volt charger power source or a direct battery voltage, and this determination may be based on the capabilities and/or preferences of device 110. Host 105 may detect whether device 110 provides the 5 volt charger source or the direct battery voltage (which may be between 3-5 volts). The host 105 may detect whether device 110 has provided the charger source or the direct battery voltage (which is between 3-5 volts) based on for example receiving a response message from device 110 and/or a measurement of the VBUS (for example, a change in the VBUS voltage). Host 105 may then determine whether to connect charging circuitry to VBUS or use a direct battery connection.

As noted, a device having a USB Type-C interface may be configured as a dual-role USB Type-C device. These dual-role devices may provide a VBUS voltage that is lower (for example, provide a voltage between 3 and 5 volts from a battery) than a standard USB charger voltage (for example, a 5 volt charger voltage), although other voltage levels may be used as well.

In some example embodiments, a USB (and/or Type-C) role negotiation may take place via the configuration channels (CC1 and CC2) to negotiate which of the devices 105 or 110 will function as a USB host and which device will function as a USB device, although the negotiation may be performed via other pins as well. In some example embodiments, the result of the negotiation may be that a device (which has more power/energy available than the other device) may offer during the negotiation a constant current mode output directly from the battery (via a current adjustment mechanism or an adjustable current generator) to a device receiving the energy to its battery or other battery storage element. This may provide for a minimum of loss of energy and a minimum heat dissipation. The process described herein may or may not depend on the initial battery states of the devices, so either the host or the device may initially have a higher battery voltage.

If host 105 is a dual-role configured device, host 105 may start to supply a direct battery connection to the VBUS line and thus device 110.

In some example embodiments, dual-role host 105 may then send a request to accessory device 110 to supply power to a VBUS. The request may comprise the allowed voltages for the VBUS, such as a charger voltage of for example 5 volts, a battery voltage between for example 3-5 volts, or both. This request message may be sent via for example any pins at connector 107, such as data pins or the CC pins (for example, as frequency modulated or via baseband communications).

Device 110 may, in some example embodiments, respond to indicate the voltage mode that the device 110 will use (for example, a charger mode or a battery mode). Accessory device 110 may, in some example embodiments, respond that it will continue as a normal mode device and thus not supply any power to VBUS, although device 110 may not send a response message but instead take action (which may be detected by host 105).

In some example embodiments, host 105 may determine the voltage mode at device 110 by receiving the response message sent by device 110 and/or by measuring the voltage applied by device 110 to the VBUS. In the case of measuring the voltage, host 105 may, in some example embodiments, utilize a voltage threshold, which may be set at for example 4.5 V (which may be set above the maximum expected battery voltage). Based on the determined voltage mode of device 110, host 105 may decide to stay in the direct battery supply mode (for example, if the measured VBUS voltage is less than 4.5 volts) or go to a normal charging mode via charging circuitry (for example, if the VBUS voltage is greater than 4.5 volts). If device 110 is not capable of providing power, host 105 may not detect any measured voltage change and may continue to provide power directly from a source, such as a battery and the like.

If host 105 and device 110 are both capable of operating in the 3-5 V mode with a direct battery connection to the VBUS at the USB interface, the batteries at host device 105 and accessory device 110 may, as noted, balance each other until the batteries approach a certain voltage, such as the same or similar voltage level, and the current between the devices 105 and 110 begins to decrease. When host 105 detects that the battery voltages in this mode are close to about the certain voltage (for example, about equal), host 105 may continue the process based on host 105's preferences as follows for example. Host 105 may be configured to maintain about equal battery levels. When this is the case, host 105 may continue to provide a direct 3-5 V battery voltage to the VBUS until device 110 detaches or the host 105's batteries run out of power. Additionally or alternatively, host 105 may be configured to maximize its battery level. When this is the case, host 105 may send a request to accessory device 110 to increase the VBUS voltage to a certain voltage, such as a charger voltage at for example 5 volts. Upon receipt of the request, accessory device 110 may or may not agree with this request (for example, accessory device 110 may have preferences or configurations that may dictate whether it accepts the request). If device 110 chooses to increase voltage to for example 5 volts, host 105 may go into a normal charging mode and may deliver power to host 105's battery via a charging circuit. If device 110 does not increase the voltage, host 105 may continue to provide a direct 3-5 V battery voltage to VBUS until the device 110 detaches or the host's battery runs out of power. Additionally or alternatively, host 105 may be configured to deliver all available battery power to device 110. When this is the case, host 105 may apply a boost converter, so that it is able to provide available battery and a charger voltage to the VBUS and host 105. Before increasing the voltage, host 105 may send a corresponding proposal message to device 110 and increase the voltage only when there is some form of an indication of acceptance (for example, a message or detected action on the part of the device 110) is received from device 110. Host 105 may continue to provide the charger power to the VBUS until device 110 detaches or the host's 105 battery runs out of power.

Figure 2A:
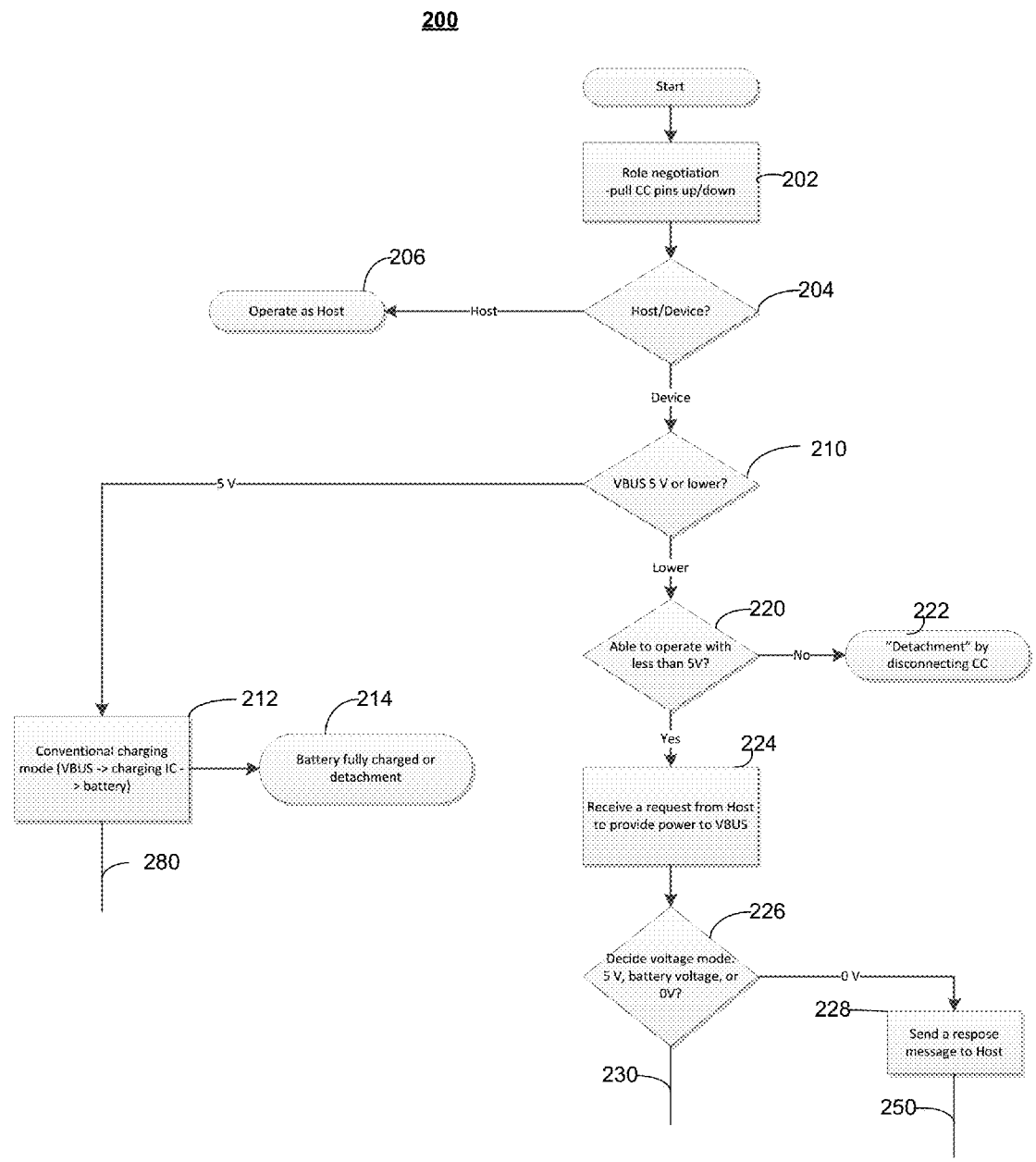
FIGS. 2A-2B depicts an example of a charging process, in accordance with some example embodiments.
Figure 2B:
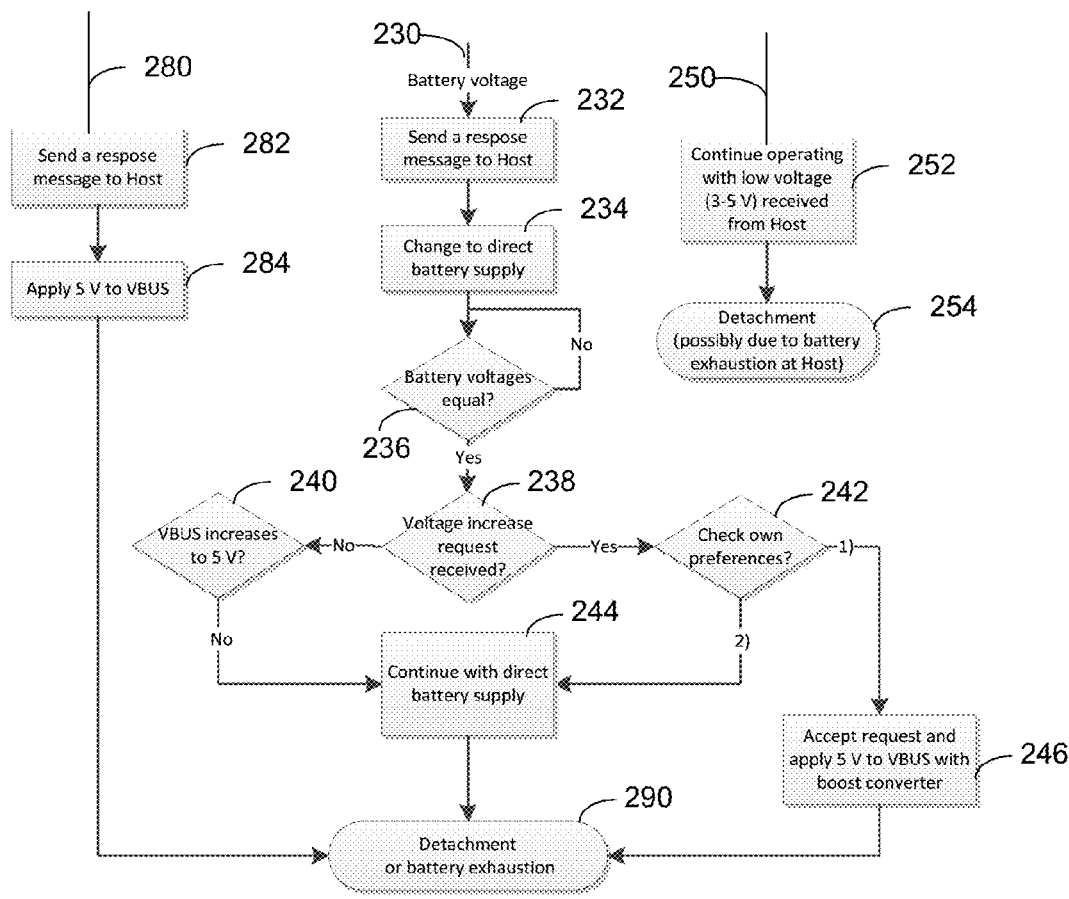

In some example embodiments, when the battery voltages are close to equal, device 110 may detect the behavior of host 105 and may act accordingly. Moreover, device 110 may not receive a request to increase VBUS voltage and may thus maintain a direct battery connection to a VBUS. Device 110 may receive the request to increase VBUS voltage to for example the charger power source. When this is the case, device 110 may either accept the request and apply a boost converter to provide a charging current to the VBUS, or device 110 may reject the request and continue with the direct battery connection to the VBUS. Device 110 may detect that host 105 has increased the VBUS voltage to the charger source power, and device 110 may go to a normal charging mode and via charging circuitry. This may be preceded by accepting host 105's proposal to increase the VBUS voltage. Device 105 may also go into a normal charging mode and may deliver power to its battery via the charging circuitry FIG. 2A-2B depict an example process 200 for charging, in accordance with some example embodiments.

At 202, a negotiation may occur between devices 105 and 110 via for example configuration channels, such as CC1 and CC2 pins. This negotiation may establish the roles of devices 105 and 110, such as which device will act as a USB host and which will act as a USB device.

At 204-206, the negotiation may result in host 105 being configured to operate as a USB host, so it may control the interaction with a USB device, such as accessory device 110.

At 210, accessory device 110 may determine its capabilities with respect to dual-role operation. Specifically, device 110 may determine the available voltage from VBUS and whether it can operate using the particular voltage, for example a direct connect battery mode voltage (at for example, 3-5 V) and/or a charger power source mode voltage (at for example 5 V). For example, the dual role operation may allow a device couple to the VBUS power directly from its battery and/or from a charger source. The battery connection to the VBUS may be at a voltage from a battery, which may be less than a typical charger source. In some of the examples described, the charger source voltage is given as 5 volts and the battery source is given as a range between 3 and 5 volts, although other voltage values may be used as well.

If accessory device 110 supports the charger power source mode (but not the battery direct connect mode), device 110 may, at 212 and 214, proceed to operate in the charger power mode and couple to the VBUS at for example 5 volts to charge the battery of host 105 until device 105's battery is charged or device 105 detaches, in accordance with some example embodiments. Alternatively or additionally, accessory device 110 may send a response message, at 280-282, to host 105 indicating that accessory 110 will apply, at 284, a charger voltage to the VBUS. Accessory device 110 may remain in this mode until there is a detachment or other event at 290.

At 220, accessory device 110 may determine whether it can operate at voltages less than a charger voltage (for example, as a dual-role device that can operate at a charger voltage, such as 5 V, and a direct connect battery voltage). If not, accessory device 110 may detach, at 222, by disconnecting the CC lines.

If accessory device 110 can operate as a dual-role device, accessory device 110 may wait to receive, at 224, an indication from host 105 to provide power to the VBUS. When this is the case, accessory device 110 may, at 226, decide what voltage mode it chooses to operate. For example, accessory device 110 may choose to supply power to the VBUS at a charger power source voltage, a battery source voltage, or not at all and continue to receive power from host 105.

At 228, accessory device 110 may send a response message to host 105, in accordance with some example embodiments. At 250-252, the response message may indicate to host 105 that accessory device 110 will continue to operate with the low battery voltage, such as a 3-5 volt battery voltage, received from host 105. The accessory device 110 may continue in this mode at 254 until for example a detachment or depletion of the host battery.

At 230-232, accessory device 110 may send a response message to host 105 indicating that accessory device 110 chooses to supply power to the VBUS at a battery power source voltage that might be less than for example a certain voltage, such as a charger voltage of 5 volts. The accessory device 110 may, at 234, and then apply a direct battery connection to the VBUS in order to supply power to host 105.

When the battery voltages of host 105 and accessory 110 are about equal (yes at 236) and an increase voltage request is received at 238, accessory device 110 may check its preferences at 242 to determine whether to continue, at 244, in the direct battery mode supplying power to the VBUS and host 105, or instead accept, at 246, the request received at 238 and apply a boosted current (for example, by adding a boost converter, which may include power from one or more other sources, such as a battery, capacitor, and/or the like).

When the battery voltages of host 105 and accessory 110 are about equal (yes at 236) and an increase voltage request is not received at 238, accessory device 110 may, at 240, continue to maintain, at 244, the battery direct connection to the VBUS and host 105, until a detach or battery depletion/exhaustion occurs at 290.

Figure 3:
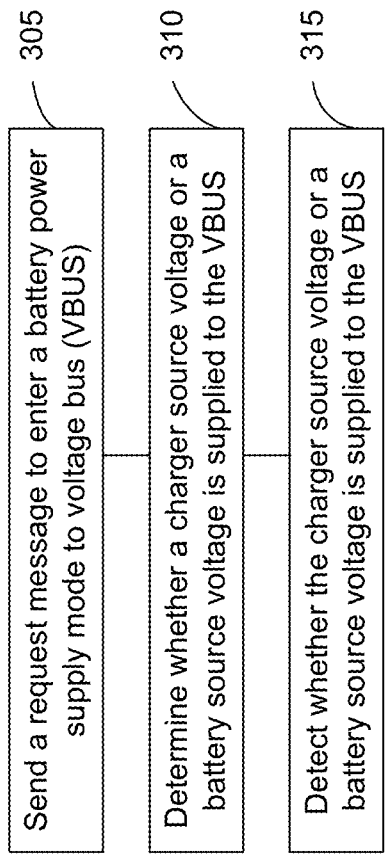
FIG. 3 depicts another example of a charging process, in accordance with some example embodiments.

FIG. 3 depicts an example process 300 for charging, in accordance with some example embodiments. The description of FIG. 3 also refers to FIG. 1.

At 305, a host 105 may send a request message to device 110 to enter a battery power supply mode, in accordance with some example embodiments. For example, host 105 may send an indication to device 110 via CC pins, and this indication may represent a request that device 110 directly connect one or more batteries at device 110 to the VBUS at device 110. Moreover, the request may indicate that the batteries should be directly connected to the VBUS without voltage boosting from a charger voltage.

At 310, device 110 may, in response to the received request, determine whether it should supply to the host 105 a charger source voltage (at for example 5 volts) or a direct battery connection voltage (at for example 3-5 volts). Moreover, the device 110 may make this determination based on the capabilities and/or preferences of device 110. Based on this determination, device 110 may connect charger circuitry or a battery to the VBUS to supply power to host 105.

At 315, host 105 may detect whether device 110 chooses to supply to the host 105 a charger source voltage or the direct battery connection voltage (at for example 3-5 volts). This detection may be performed based on a received indication, such as a message and the like, from accessory 110 or based on a measurement made of the VBUS where the voltage level may vary based on the device's 105 decision at 315.

Figure 4:
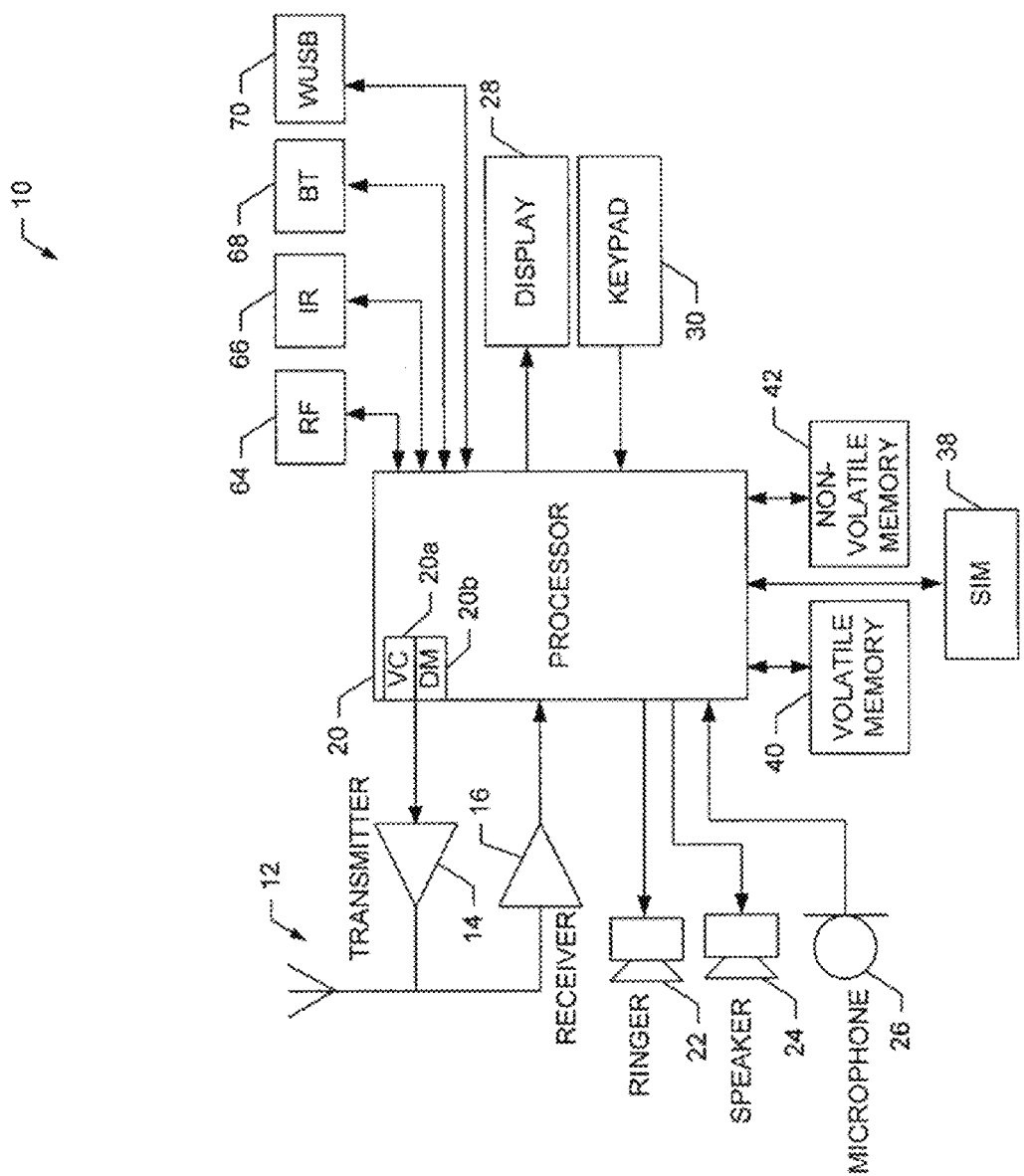
FIG. 4 depicts an example of a user equipment, in accordance with some example embodiments.

FIG. 4 illustrates a block diagram of an apparatus 10, in accordance with some example embodiments. For example, apparatus 10 may be implemented a host, an accessory, and/or any other device, and these devices may each include at least one connector, such as a USB Type-C connector, although other types of connectors may be implemented as well. The apparatus may also comprise a user equipment, such as a smart phone, a source of audio, a sink of audio, a microphone, a headset, a digital headset, a television, a charger, and/or any other device.

The apparatus 10 may, in some example embodiments, include at least one antenna 12 in communication with a transmitter 14 and a receiver 16. Alternatively transmit and receive antennas may be separate.

The apparatus 10 may, in some example embodiments, also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of a host and/or a device as disclosed herein. The memories may comprise an identifier, such as an international mobile equipment identification (IMEI) code, capable of uniquely identifying apparatus 10. The functions may include one or more of the operations disclosed with respect to the host and/or the device as described with respect to FIG. 2A-2B, and/or 3B. The memories may comprise an identifier, such as an international mobile equipment identification (IMEI) code, capable of uniquely identifying apparatus 10. In the example embodiment, the processor 20 may be configured using computer code stored at memory 40 and/or 42 receive a request message to enter into a battery power supply mode, determine whether to supply to a bus one of a battery source or a power charger source, and couple, based on the determining, one of the battery source or the power source to the bus to supply power to a host.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is energy transfer and/or charging speed may be enhanced.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, at a device, a request message to enter into a battery power supply mode;
   determining, by the device, whether to supply to a bus one of a battery source or a power charger source; and
   coupling, by the device, based on the determining, one of the battery source or the power charger source to the bus to supply power to another device.

2. The method of claim 1, wherein the device is configured to couple the battery source, the power charger source, or a combination of both to the bus comprising a voltage bus.

3. The method of claim 1, wherein the device determines whether to supply the battery source or the power charger source based on at least one of a capability of the device or a preference of the device.

4. The method of claim 1 further comprising:
   sending a message to indicate whether the device will supply to the bus one of the battery source or the power charger source.

5. The method of claim 1, wherein the device includes an interface though which the request message is received.

6. The method of claim 5, wherein the interface comprises a universal serial bus connector.

7. The method of claim 5, wherein the interface comprises a universal serial bus type-c connector.

8. An apparatus comprising:
   at least one processor; and
   at least one memory including computer program code, the at least one memory and the computer program code configured to, with the at least one processor, cause the apparatus to perform at least the following:
   receive a request message to enter into a battery power supply mode;
   determine whether to supply to a bus one of a battery source to achieve a determination or a power charger source; and
   couple, based on the determination, one of the battery source or the power charger source to the bus to supply power to another device.

9. The apparatus of claim 8, wherein the apparatus is further configured to couple the battery source, the power charger source, or a combination of both to the bus comprising a voltage bus.

10. The apparatus of claim 8, wherein the apparatus is further configured to at least determine whether to supply the battery source or the power charger source based on at least one of a capability of the apparatus or a preference of the apparatus.

11. The apparatus of claim 8, wherein the apparatus is further configured to at least send a message to indicate whether the apparatus will supply to the bus one of the battery source or the power charger source.

12. The apparatus of claim 8, wherein the apparatus includes an interface through which the request message is received.

13. The apparatus of claim 12, wherein the interface comprises a universal serial bus connector.

14. The apparatus of claim 12, wherein the interface comprises a universal serial bus type-c connector.

15. A non-transitory computer-readable storage medium including program code which, when executed by at least one processor, causes said at least one processor to perform operations comprising:
   receiving a request message to enter into a battery power supply mode;
   determining whether to supply to a bus one of a battery source or a power charger source; and
   coupling, based on the determining, one of the battery source or the power charger source to the bus to supply power to another device.

16. An apparatus comprising:
   at least one processor; and
   at least one memory including computer program code, the at least one memory and the computer program code configured with the at least one processor to cause the apparatus to perform at least the following:
   send a request message to a device to supply power to a voltage bus;
   determine a power supply type of the device; and
   couple, based on the determined the power supply type, one of a battery or a charging circuitry to the voltage bus to receive power from the device.

17. The apparatus of claim 16, wherein the power supply type of the device is one of a battery source or a power charger source.

18. The method of claim 16, wherein the power supply type is determined based on detecting a voltage at the voltage bus or receiving a message from the device.

19. A method comprising:
   sending, by a host device, a request message to another device to supply power to a voltage bus;
   determining, by the host device, a power supply type of the another device; and
   coupling, by the host device, based on the determined power supply type, one of a battery or a charging circuitry to the voltage bus to receive power from the another device.

20. A non-transitory computer-readable storage medium including program code which, when executed by at least one processor, causes said at least processor to perform operations comprising:
   sending a request message to a device to supply power to a voltage bus;
   determining a power supply type of the device; and
   coupling, based on the determined power supply type, one of a battery or a charging circuitry to the voltage bus to receive power from the device.

* * * * *